(12) United States Patent
Townsend

(10) Patent No.: US 6,750,865 B2
(45) Date of Patent: Jun. 15, 2004

(54) VIDEO SIMULATION

(75) Inventor: Peter Townsend, Burley (GB)

(73) Assignee: Pumpkin Pie Net Limited, Hampshire (GB)

( * ) Notice: Subject to any disclaimer, the term of this patent is extended or adjusted under 35 U.S.C. 154(b) by 247 days.

(21) Appl. No.: 10/074,869

(22) Filed: Feb. 13, 2002

(65) Prior Publication Data

US 2002/0149590 A1 Oct. 17, 2002

(30) Foreign Application Priority Data

Feb. 13, 2001 (EP) .......................................... 01301279

(51) Int. Cl.[7] .............................................. G06T 11/00
(52) U.S. Cl. ..................................................... 345/473
(58) Field of Search ................................ 345/473, 474, 345/475, 702, 706, 707, 771, 952, 960; 463/37

(56) References Cited

U.S. PATENT DOCUMENTS

| | | | |
|---|---|---|---|
| 4,752,069 A | 6/1988 | Okada .......................... | 273/1 |
| 5,232,223 A | * 8/1993 | Dornbusch .................... | 463/37 |
| 5,660,547 A | 8/1997 | Copperman ................... | 434/29 |
| 5,695,401 A | 12/1997 | Lowe et al. .................... | 463/4 |
| 5,772,512 A | 6/1998 | Chichester .................... | 463/40 |

OTHER PUBLICATIONS

Terumasa, Japanese Patent Abstract No. 03007980, Video System of Fishing Simulator, Published Jan. 16, 1991.

* cited by examiner

Primary Examiner—Almis R. Jankus
(74) Attorney, Agent, or Firm—Andrus, Sceales, Starke & Sawall, LLP

(57) ABSTRACT

In a method of providing a video simulation on a computer, parameter selection options (S1–S7) and possible parameter values (I1–I6; F1–F9) are displayed, and are selectable by the user. The outcome of the simulation is determined according to the combination of parameters selected by the user, user interaction during a simulation video clip, and additionally according to a random or pseudo-random determination. An outcome video clip (V) corresponding to the outcome is selected and displayed.

14 Claims, 13 Drawing Sheets

VIDEO SIMULATION

FIELD OF THE INVENTION

The present invention relates to a method, apparatus and a computer program for implementing a simulation using video clips.

BACKGROUND OF THE INVENTION

Laserdisc video games have been known at least since 1982, with the launch of 'Astron Belt' by Sega and 'Dragons Lair' by Cinematronics. The laser discs stored video clips corresponding to possible events, for example in a graphical adventure. The events were selected according to inputs by the user, such as pressing buttons or manipulating joysticks. In general, these systems used animated video clips, but later versions launched in the early 1990s (e.g. 'Mad Dog Macree' by American Laser Games) used live video clips, sometimes in combination with computer-rendered graphics. However, such games have since fallen out of favour, because the number of video clips which can feasibly be produced and stored is limited, and players therefore quickly tire of them.

Hence, at least for simulation games such as golf, fishing and adventure games, video clips have been almost completely superseded by fully computer-rendered graphics. The only exception is the non-interactive video sequences which often intersperse computer-rendered interactive sessions in a game.

Even on high-end personal computers and consoles which are now available, computer-rendered graphics cannot approach the realism of pre-recorded video sequences. Such realism is particularly desirable in simulation games such as golf or fishing games, which aim to stimulate famous courses or locations. Hence, there is a need to combine the realism of laserdisc games with the interactivity of computer-rendered games.

Furthermore, there is a need to allow complex interaction by the user during a video sequence display stage of the simulation.

The document U.S. Pat. No. 5,434,678 discloses a video system for selective retrieval of non-sequentially stored video sequences, to display a version of a video program edited according to a user's preferences.

The document U.S. Pat. No. 5,772,512 described an American football simulation gage which generates graphics and statistics representing game play. Where the game play is similar to a famous real game play, a video clip of that famous play is displayed; this is an example of the non-interactive interspersed video sequences described above.

The document U.S. Pat. No. 4,752,069 describes a help function in a laser disc game. During a period in which a user should move a lever to avoid losing the game, an arrow appears on screen to tell the user which way to move the lever.

STATEMENT OF THE INVENTION

According to the present invention, there is provided a method of providing a simulation on a computer, in which parameter selection options and possible parameter values are displayed, and are selectable by the user. A simulation video clip id displayed and user interactions are received during the display of the simulation video clip. An outcome of the simulation is determined depending on the user interactions and/or the selected parameter values and/or a pseudo-random determination and an outcome video clip corresponding to the outcome is displayed. The outcome may be determined before the end of the simulation video clip and the simulation video clip may be terminated and replaced by the outcome video clip in that case.

Indicia may be displayed during the simulation video clip and the display state of the indicia may vary in response to the user interactions before the outcome is determined. The outcome may be determined at least in part by the display state of the indicia during the simulation.

In an embodiment of the present invention, there is provided a first-person perspective video simulation of an activity in which the position of the view point is substantially static: for example, fishing, goalkeeping in a penalty shoot-out in Association football, or batting in baseball. In an embodiment of the invention, there is

BRIEF DESCRIPTION OF THE DRAWINGS

A specific embodiment of the present invention will now be described with reference to the accompanying drawings, in which.

DESCRIPTION OF EMBODIMENTS

Computer

Figure 1:
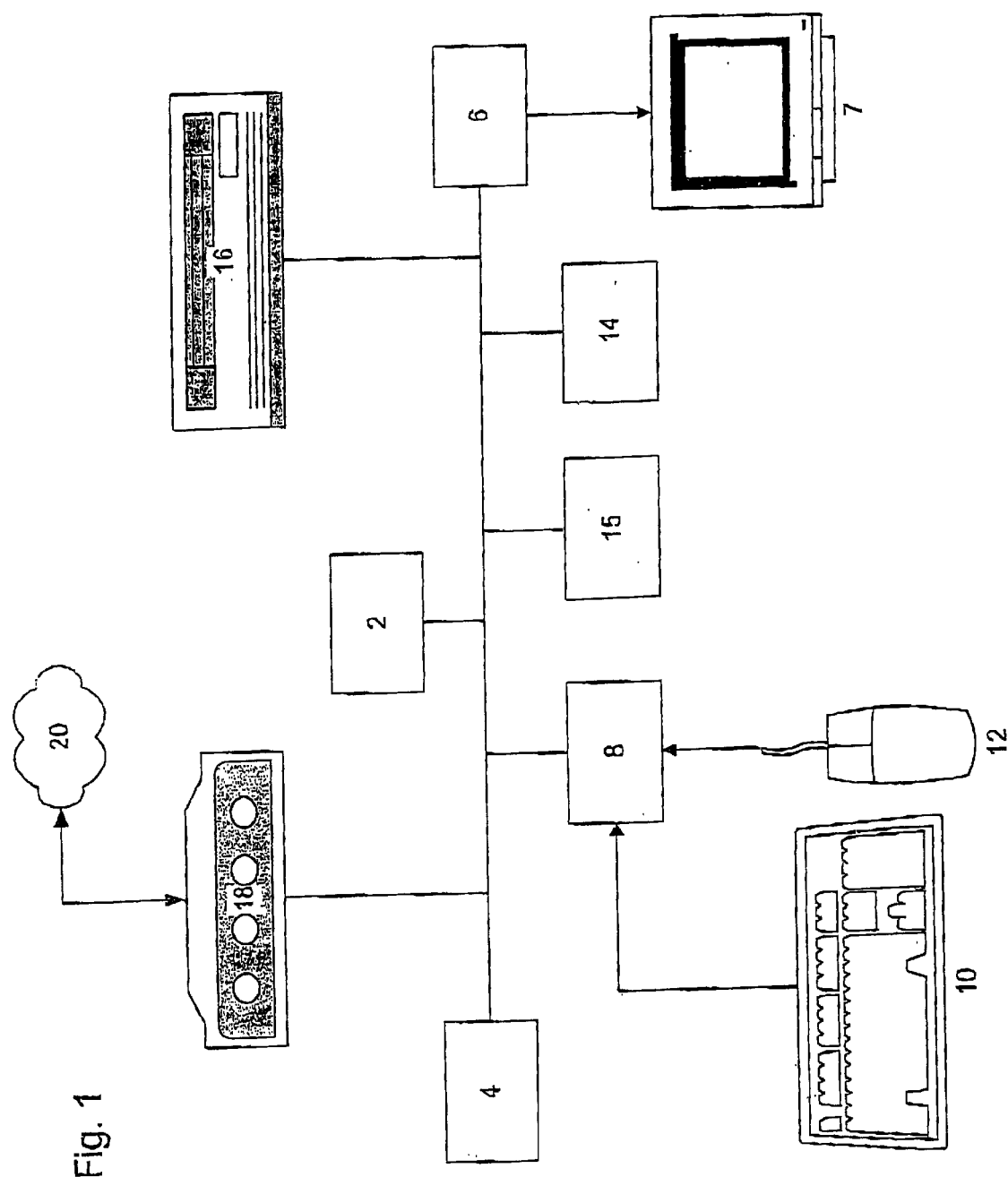
FIG. 1 is a schematic diagram of a computer for running a video simulation according to the embodiment.

As shown in FIG. 1, a computer for running the game consists of a CPU 2 connected via a bus to memory 4, including at least EPROM and RAM, a graphics interface 6, including a graphics processor connected to a monitor 7, an I/O interface 8 connected to a keyboard 10 and mouse 12, an audio interface 14 including an audio processor, a hard disc drive 15, a removable disc drive 16, and a network interface 18 for connection to a network 20. In one specific embodiment, the computer is a PC-compatible computer, the removable disc drive 16 is a DVD drive and the network interface 18 is a broadband interface such as an ADSL or cable modem. The computer runs a Win32 operating system such as Windows XP™, including the Windows Media Player ActiveX component for video playback.

This and other types of computers or games consoles are well-known and do not need to be described further, save that the computer should be able to handle and display, substantially in real time, video data stored on the removable disc drive 16 and/or the hard disc drive 15, and/or accessed over the network interface 18, concurrently with superimposed computer-generated graphics, sounds or other indicia.

Computer Program and Video Clips

The game according to the embodiment is a fly fishing simulation involving a computer program and a set of randomly accessible video clips of various actions involved in fly fishing, such as casting, striking, playing a fish, landing a fish or losing a fish. Each of these actions is recorded at a plurality of beat locations and at a plurality of times of year for each location. Additionally, each action may be recorded with different types, such as casting upstream or downstream, or with different equipment, such as different rod lengths, or from different positions, such as wading or on a riverbank. The video clips are stored in a compressed format, such as MPEG 1. The recorded video clips are indexed and copied onto a removable medium of sufficient capacity, such as a DVD-ROM, together with the index. The computer program may also be stored on the DVD-ROM, or loaded onto the computer from some other medium. In one example, the computer program was written in Microsoft Visual Basic version 6.

Simulation Stages

Figure 2:
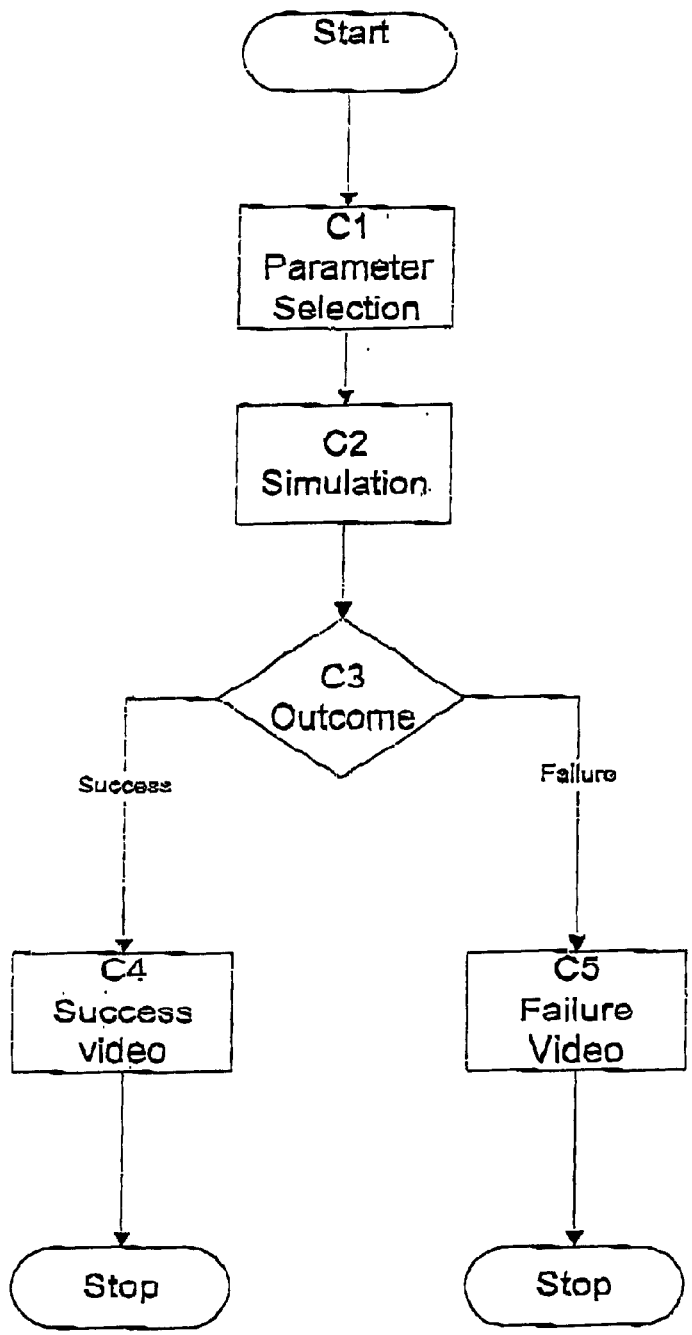
FIG. 2 is a flowchart of the stages of operation of the simulation.

As shown in FIG. 2, the simulation includes a parameter selection stage C1, in which various parameters are selected for the simulation, and an interactive video display stage C2 in which one or more video clips is selected and displayed according to the various selected parameters and according to actions performed by the user during the simulation. The display stage C2 ends when a final outcome has been determined at stage C3.

If the outcome is successfull, a success video clip is displayed at stage C4. If the outcome is a failure, a failure video clip, or no video clip, is displayed at stage C5.

Parameter Selection Stage

Figure 3:
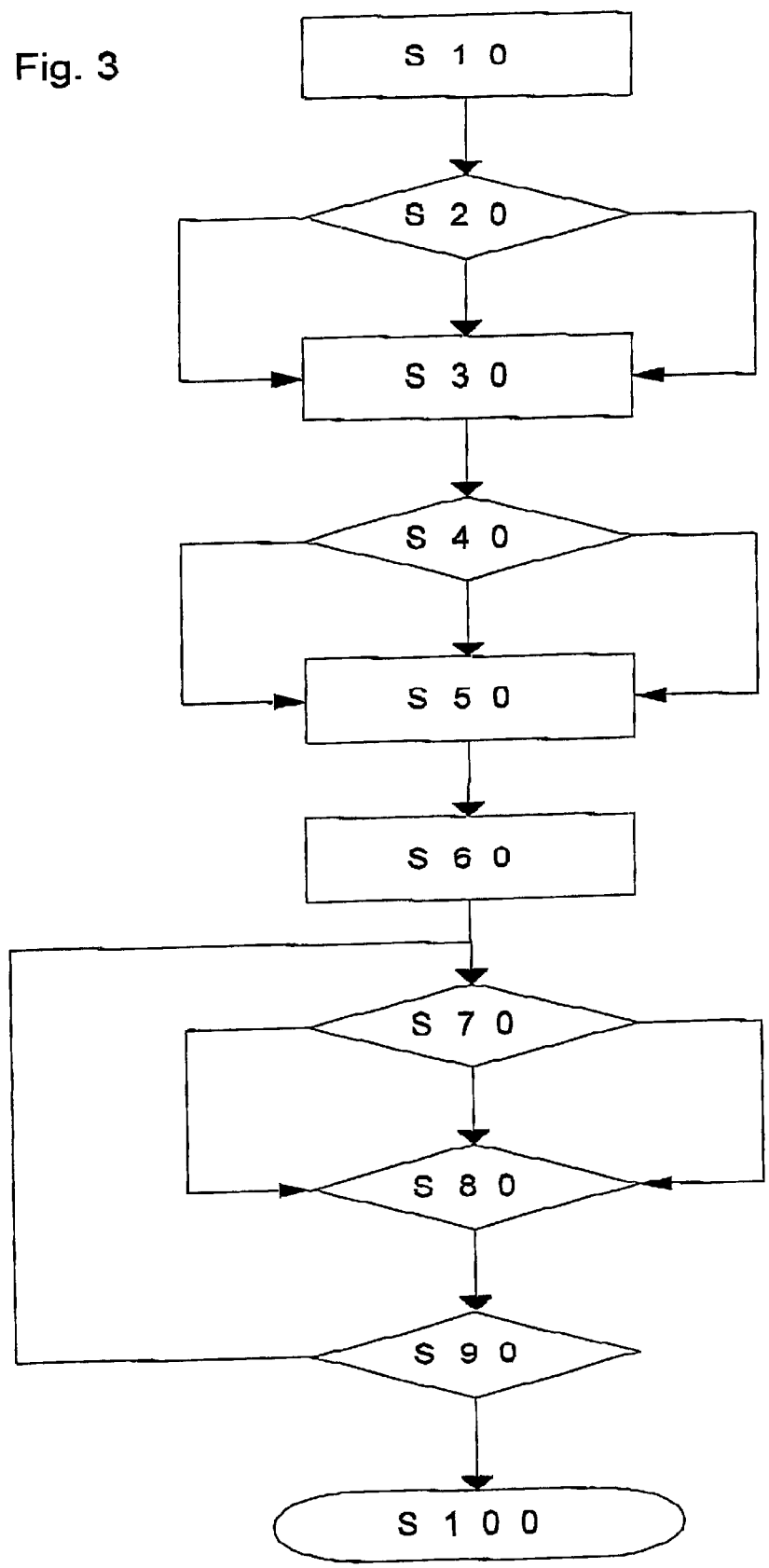
FIG. 3 is a flowchart of a parameter selection stage of the simulation.
Figure 4:
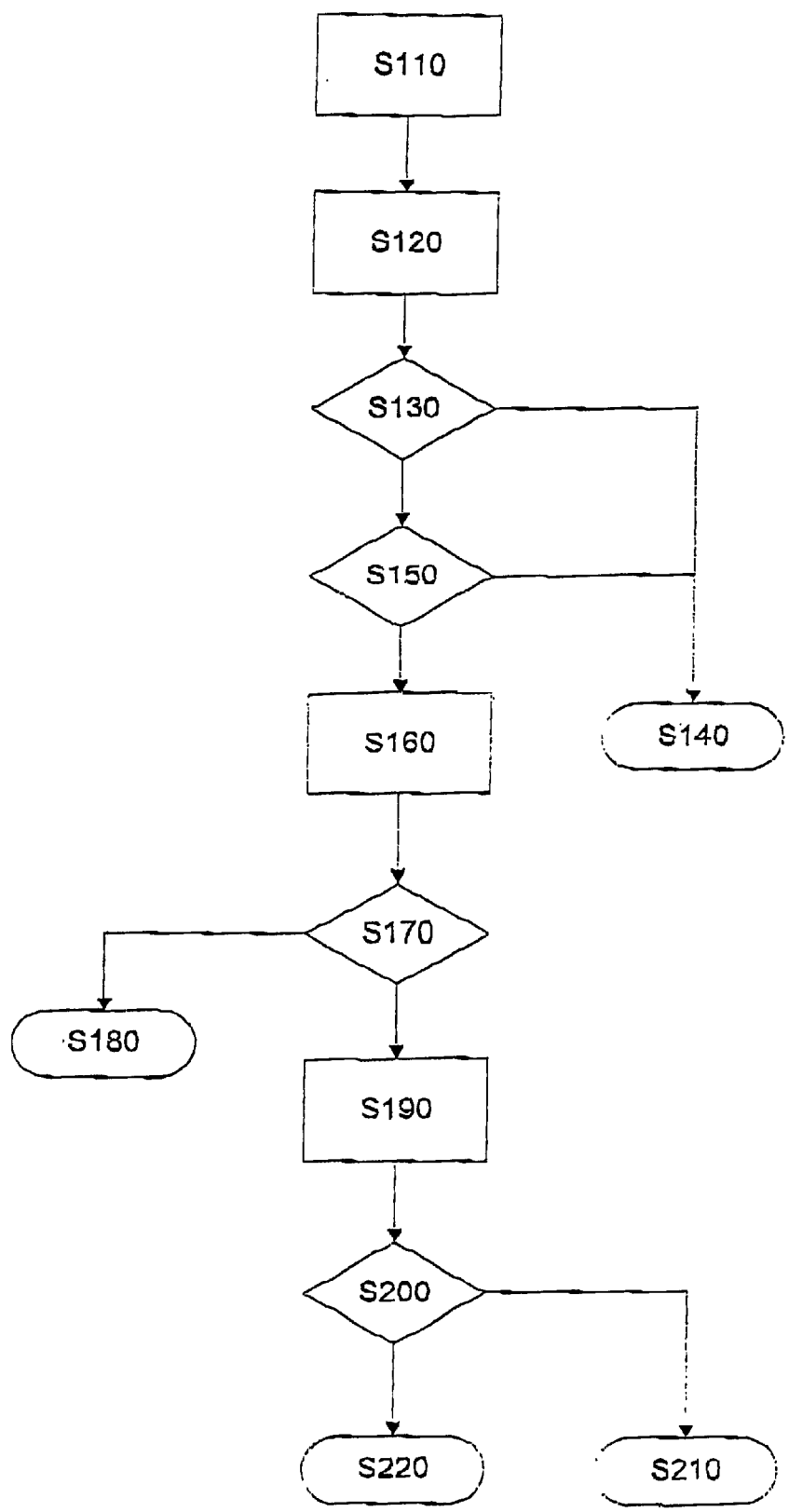
FIG. 4 is a flowchart of an interactive video display stage of the simulation.
Figure 5:
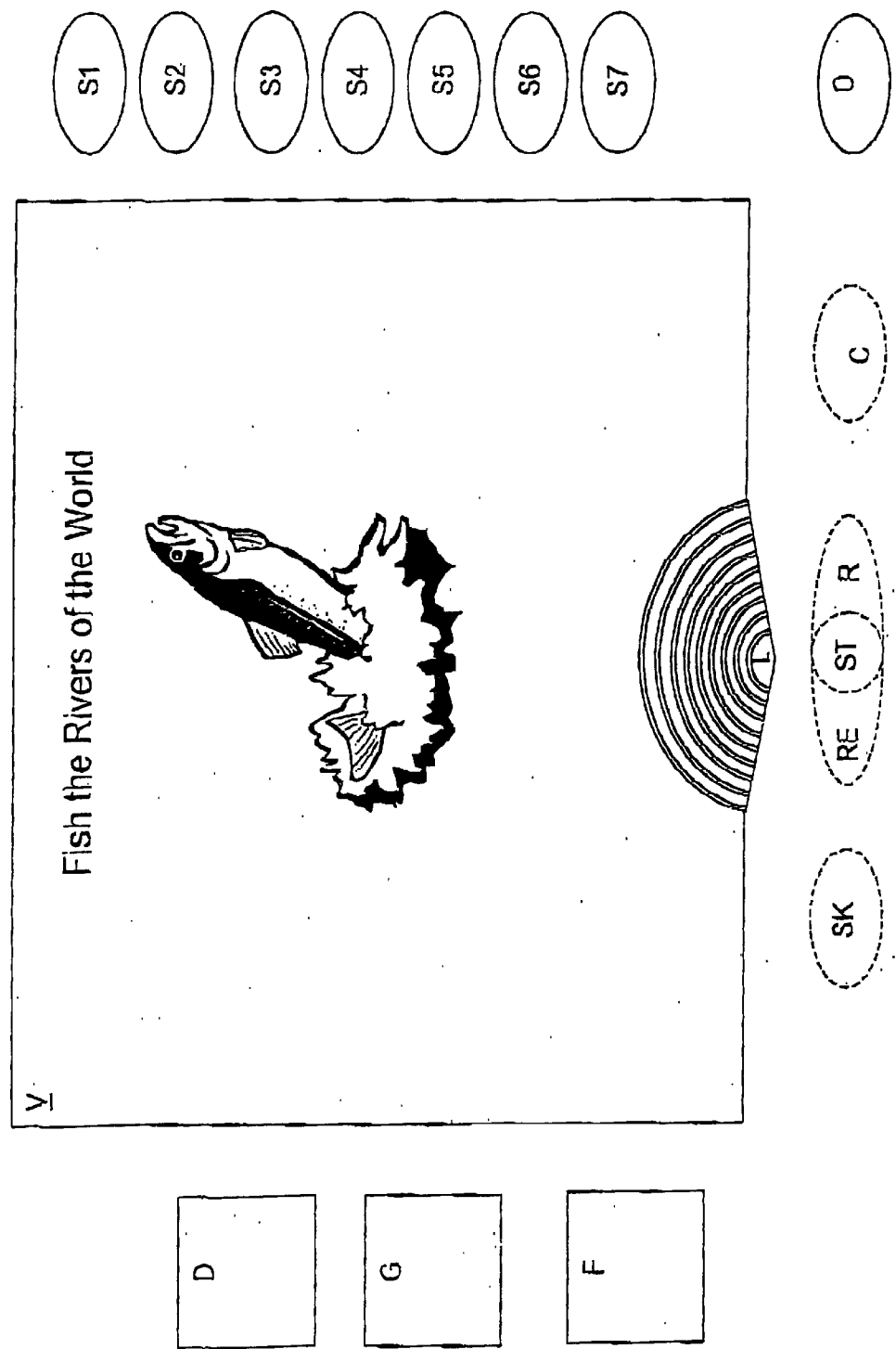
FIGS. 5 to 11 are schematic diagrams of a display during the parameter selection stage.

The parameter selection stage C1 is represented in detail by the flowchart of FIGS. 3a and 3b, while FIG. 5 shows a display at the beginning of the parameter selection stage C1, Selection buttons S1 to S7 are used to select values for different parameters, as shown in Table 1 below:

TABLE 1

| Button | Parameter |
| --- | --- |
| S1 | Destination |
| S2 | Location |
| S3 | Rod |
| S4 | Line |
| S5 | Tippet |
| S6 | Ply |
| S7 | Drag |

Parameters not currently available for selection, for example because another parameter must be selected first, are shown by 'greying out' the corresponding buttons. Once parameter values are selected, the button displays the value selected.

A diary button D can be clicked on by the user at any time during the parameter selection stage C1 to open a diary window. The diary window displays a list of previous fish caught, preferably in a form which represents a diary. Clicking on a list item causes the details of the catch to be displayed, together with a thumbnail image which, when clicked on, replays the video sequence of that fish being caught and landed. The total number of fish caught on that location out of the maximum possible number of fish available to be caught is also displayed. The diary contents are saved in a file under the name of the fisherman as entered.

A ghillie assistance button G can be clicked on by the user at any time during the parameter selection stage C1 to open a ghillie assistance window, which displays context-sensitive help information as described below.

Figure 6:
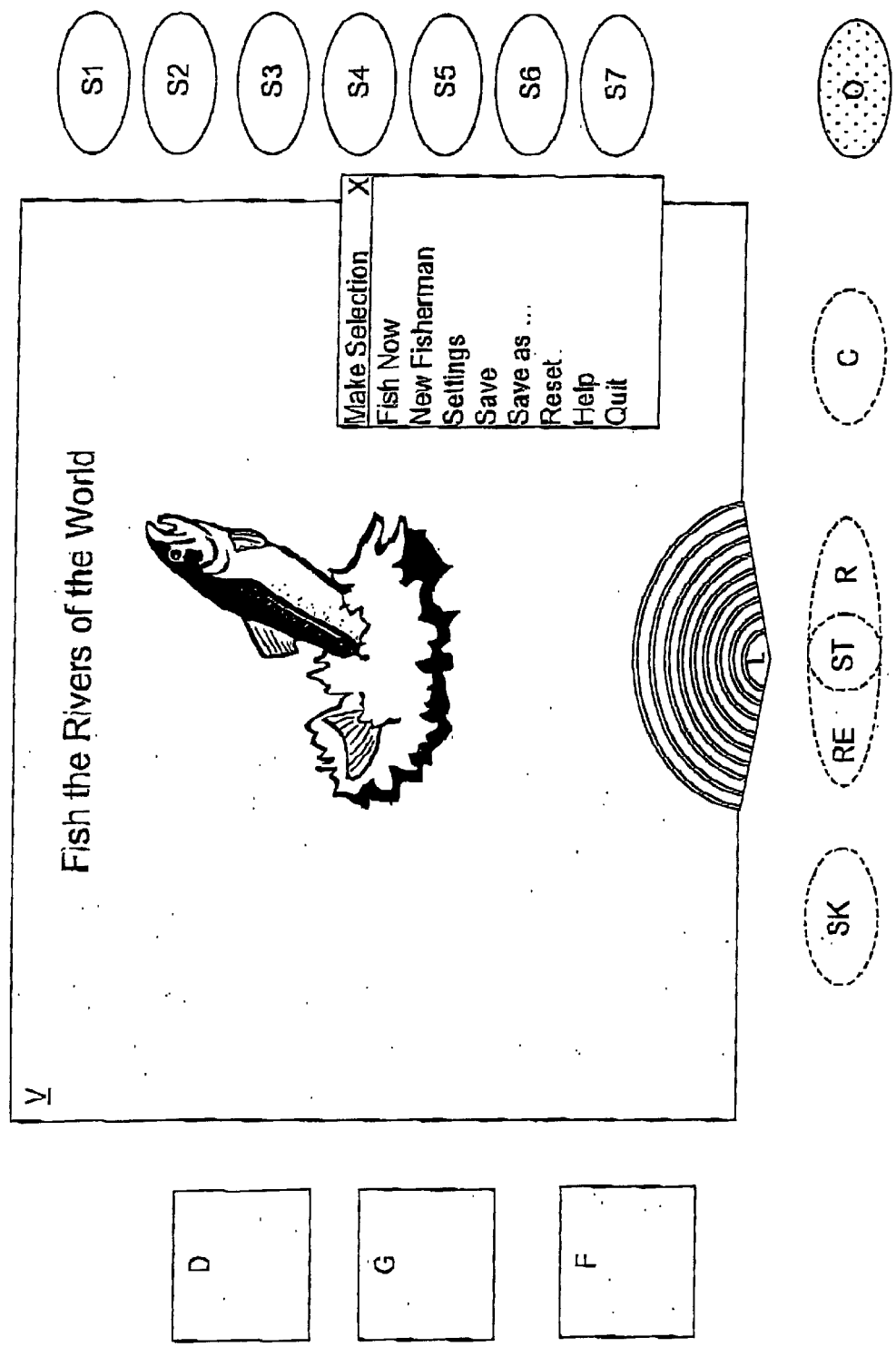

To begin parameter selection, at step S10, the user clicks an 'options' button O and a pop-up menu is displayed, as shown in FIG. 6, which performs user-selected functions as described in Table 2 below:

TABLE 2

| Selection | Function |
| --- | --- |
| Fish Now | Opens a menu offering the options New Fisherman, Delete and Resume Fishing, together with a list of saved fisherman names |
| New Fisherman | Allows entry of new fisherman name |
| Settings | Allows toggling of background sound effects, voiceover. and incidental, sounds |
| Save | Saves the current game, including diary contents |
| Save as . . . | Saves under a new name |
| Reset | Closes the current game without saving and returns to the beginning of the parameter selection stage. |
| Help | Opens scrolling help index window |
| Quit | Prompts user to save game, then quits |

Figure 7:
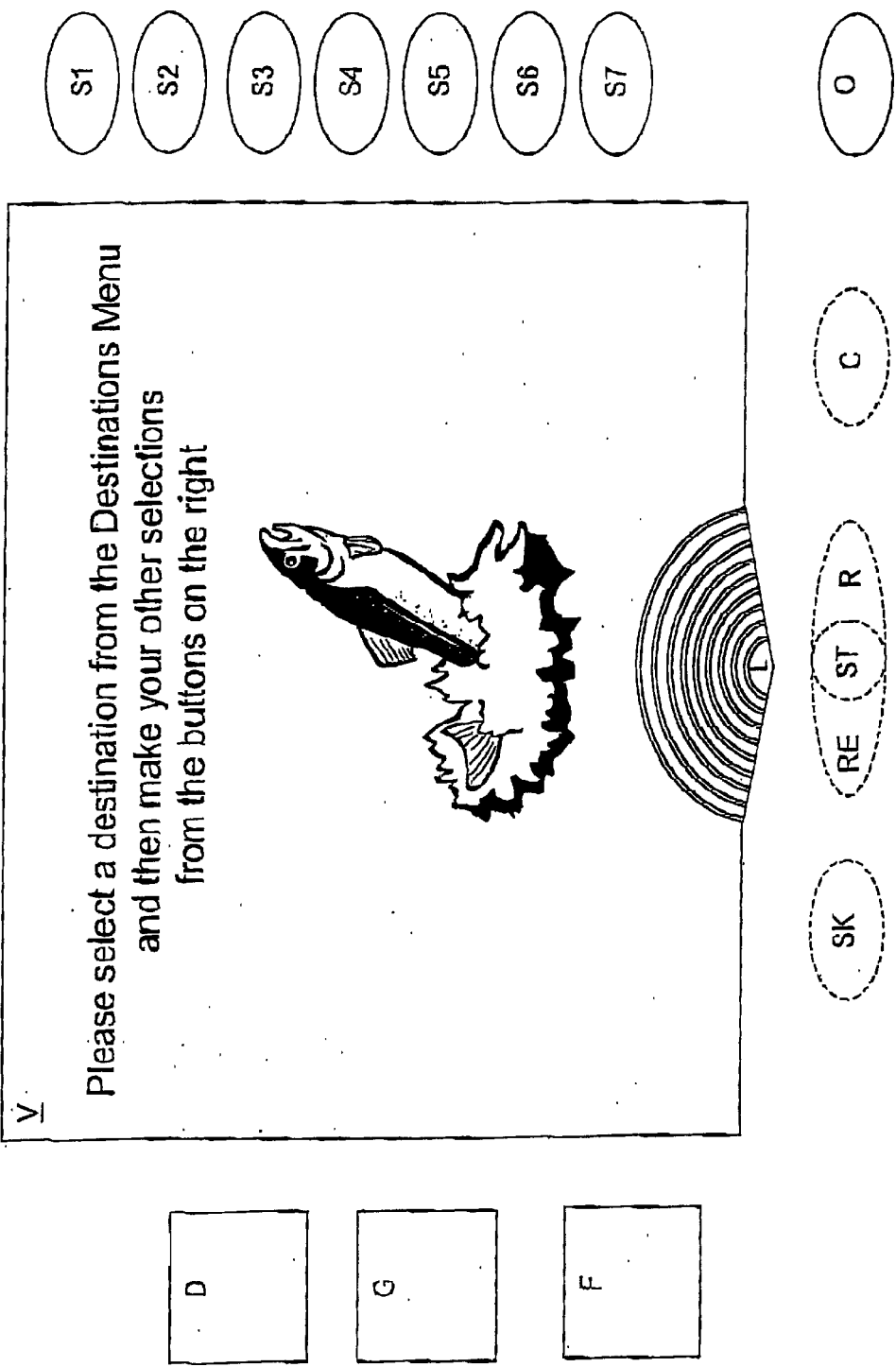
Figure 8:
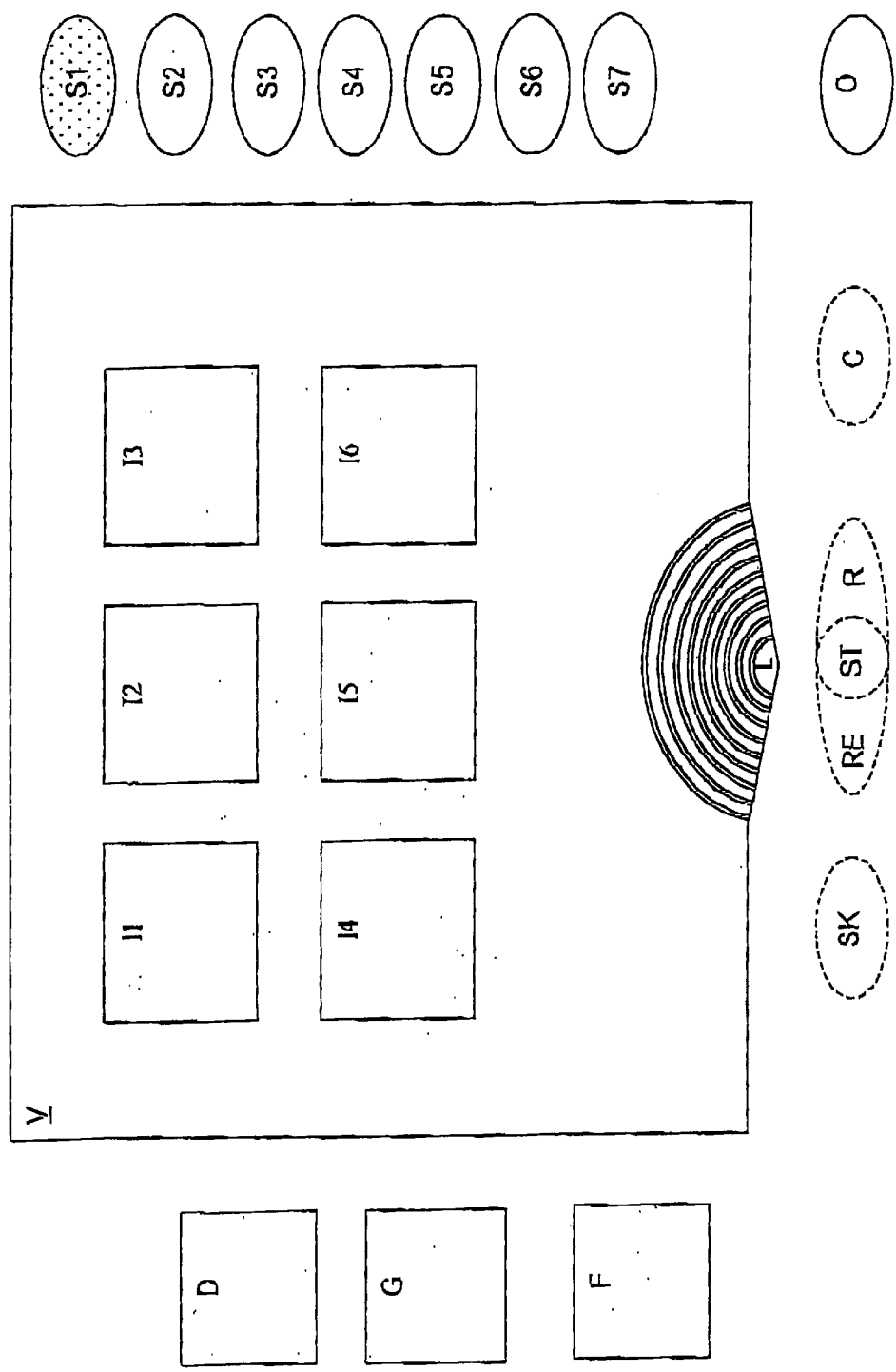

Once the user has selected a current name or to resume fishing, the user clicks the destination selection button S1 and is prompted as shown in FIG. 7, to select a destination option by clicking the selection button S1, at step S20. A display window as shown in FIG. 8 is then displayed, showing small images I1 to I6 of the possible destinations. The user selects a destination at step S30 by clicking on the desired image. Next, the user clicks the location selection button S2, the possible locations at the selected destinations are displayed (step S40), and the user selects one of them (step S50). A map-based display may be used to display the available locations at the selected destination.

Figure 9:
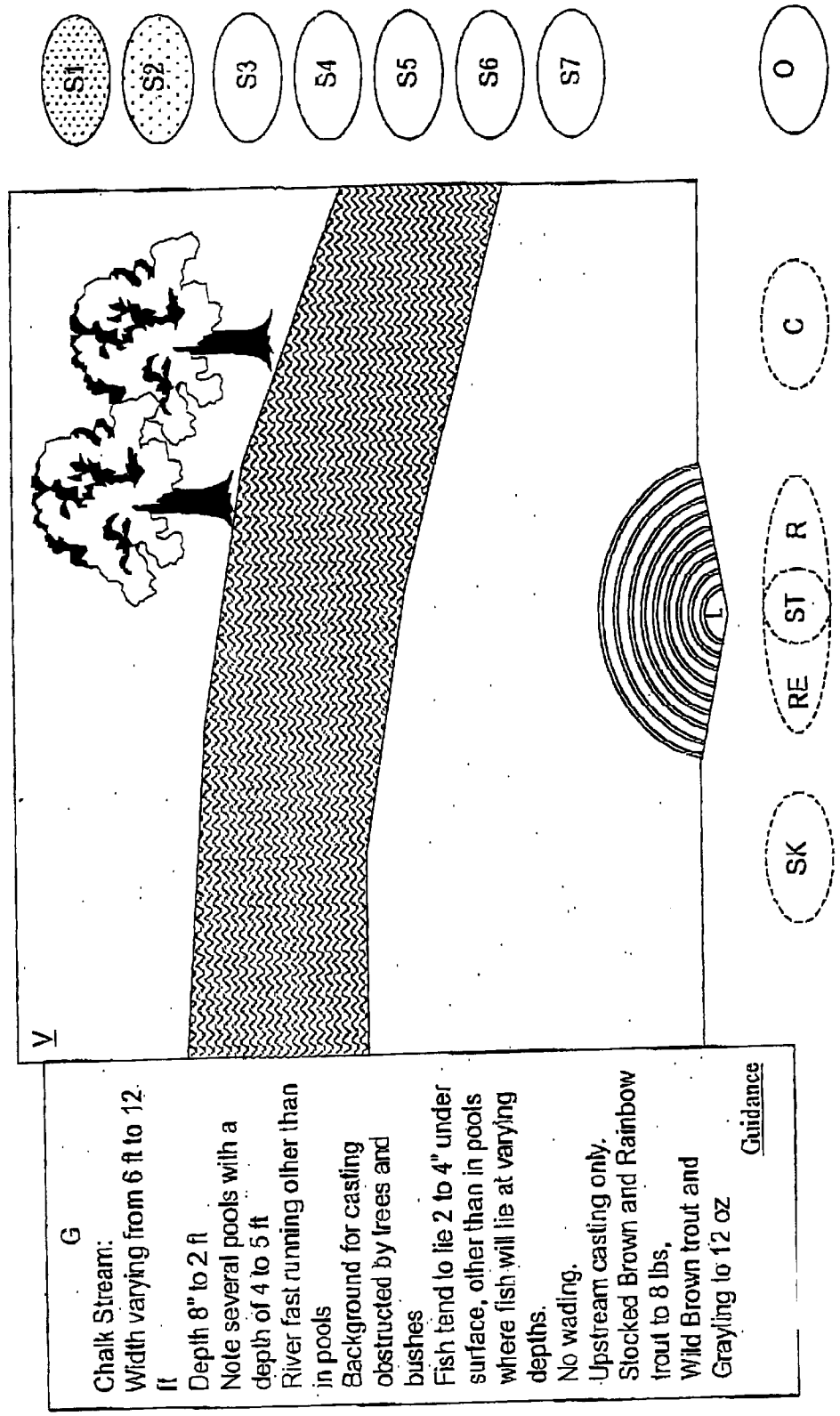

In the case shown in FIG. 9, the user has selected beat number 1 on the selected river. An introductory video clip of the location is displayed, with a voiceover describing the location and suggesting appropriate parameter selections (step S60). Once the location has been selected, clicking on the ghillie assistance button G will display a page containing a test summary of the voiceover, for example:

Chalk Stream
 Width varying from 6 ft to 12 ft
 Depth 8" to 2 ft
 Note several pools with a depth of 4 to 5 ft
 River fast running other than in pools
 Background for casting obstructed by trees and bushes
 Fish tend to lie 2 to 4" under surface, other than in pools where fish will lie at varying depths.
 No wading.
 Upstream casting only.
 Stocked Brown and Rainbow trout to 8 lbs. Wild Brown trout and Grayling to 12 oz.

The user may click a 'guidance' option at the bottom of the page, which causes a guidance page to be displayed, containing an explanation of the hints in the text summary and a 'more' option. Selecting 'more' displays an 'advice' page containing further hints on parameter selection, and an 'instruction' option. Clicking on the 'instruction' option displays a page listing the correct parameters to use for the current location. In this way, the user may select progressively more detailed instructions, or use their own fishing knowledge to guess the correct parameter settings.

Figure 10:
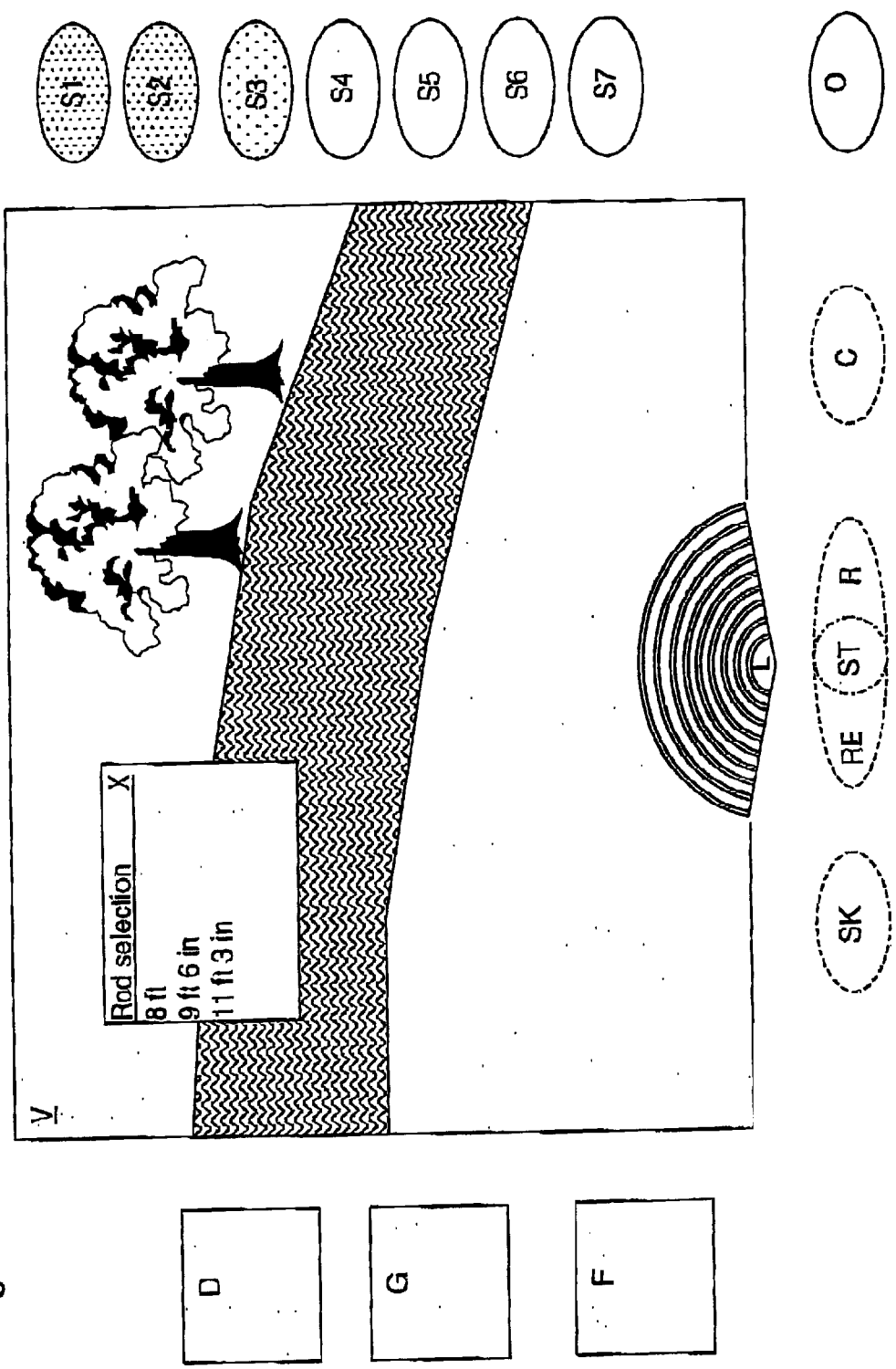

The user may then select the rod, line, tippet, fly and drag parameters by clicking on the corresponding parameter selection buttons S3–S7. The available options are displayed (S70) and the user selects one (S80). For example, the user then selects a 'rod selection' option, by clicking the rod selection button S3. The possible rod lengths (e.g. 8 ft, 9 ft 6 in and 11 ft 3 in) are presented as shown in FIG. 10 and the user selects one of these.

Figure 11:
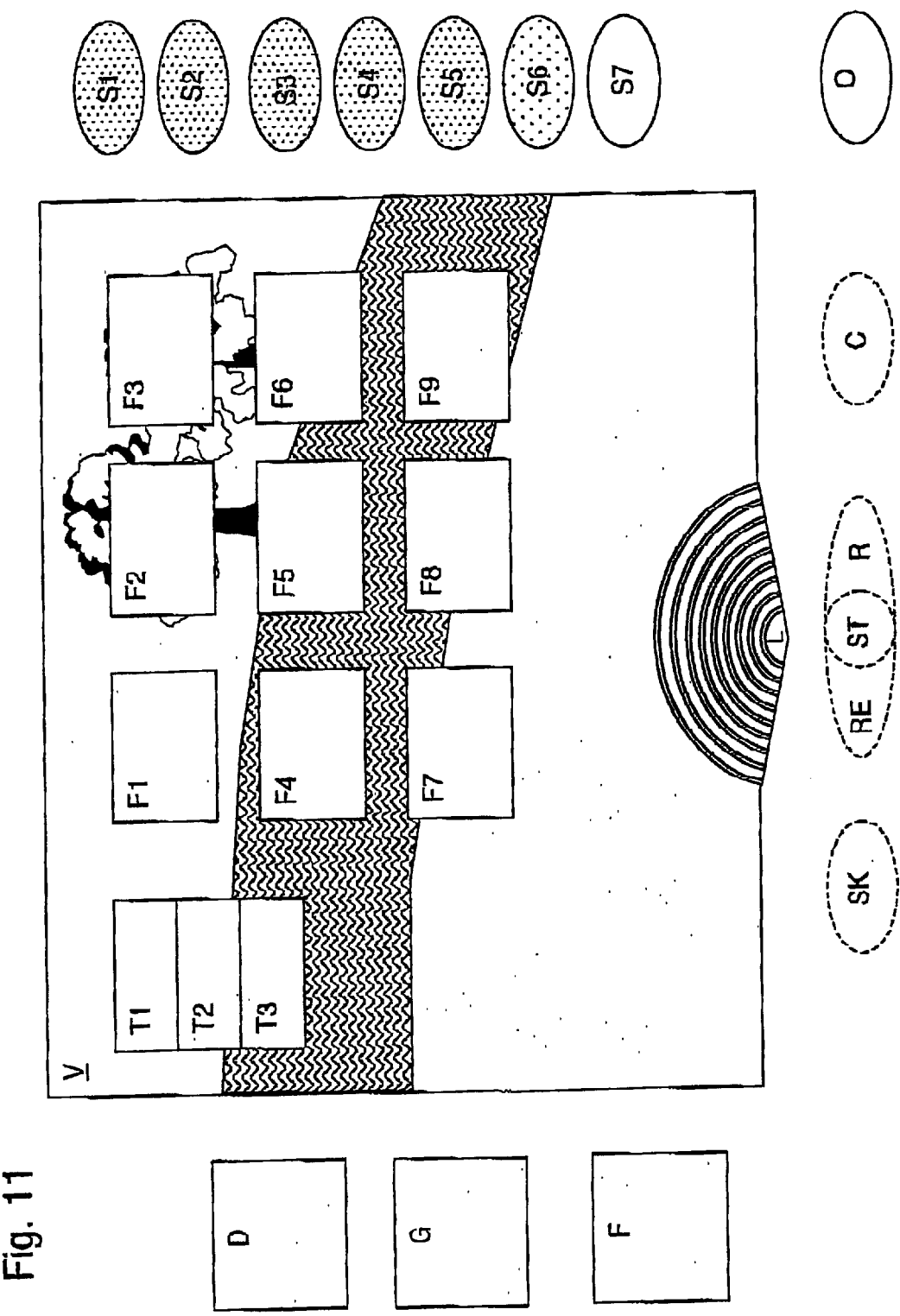

As another example, the user selects a 'fly selection' option, by clicking on the fly selection button S6. As shown in FIG. 11, fly buttons F1 to F9 are then displayed, each with a description and/or picture of the relevant fly, and the user selects a fly by clicking on the corresponding button. The type of fly displayed, such as wet, dry or nymph, is varied by the user clicking on fly type buttons T1, T2 or T3. The selected fly is displayed in a fly box F.

The type of fly selected may then determine the types of line which can be presented for selection. In that case, the line parameter button S4 is greyed out until the fly parameter value has been selected. Subsequently clicking on the line parameter button then displays only those parameter values which are possible with the selected fly. For example, if a wet fly has been selected and the user many select between floating and sinking lines. Alteratively, the user may be permitted to select any of the available line types, and may use the Ghillie assistance option to obtain advice on which to choose.

Once all of the parameters have been selected (S90), the program proceeds to the interactive video display stage (S100).

Interactive Video Display Stage

A set of buttons below the video window V which have been greyed out during the parameter selection stage, are displayed in full colour to indicate that they are now active. The buttons are: 'Cast' C, 'Strike' ST, 'Retrieve 'RE' and 'Run' R.

Cast

Figure 12:
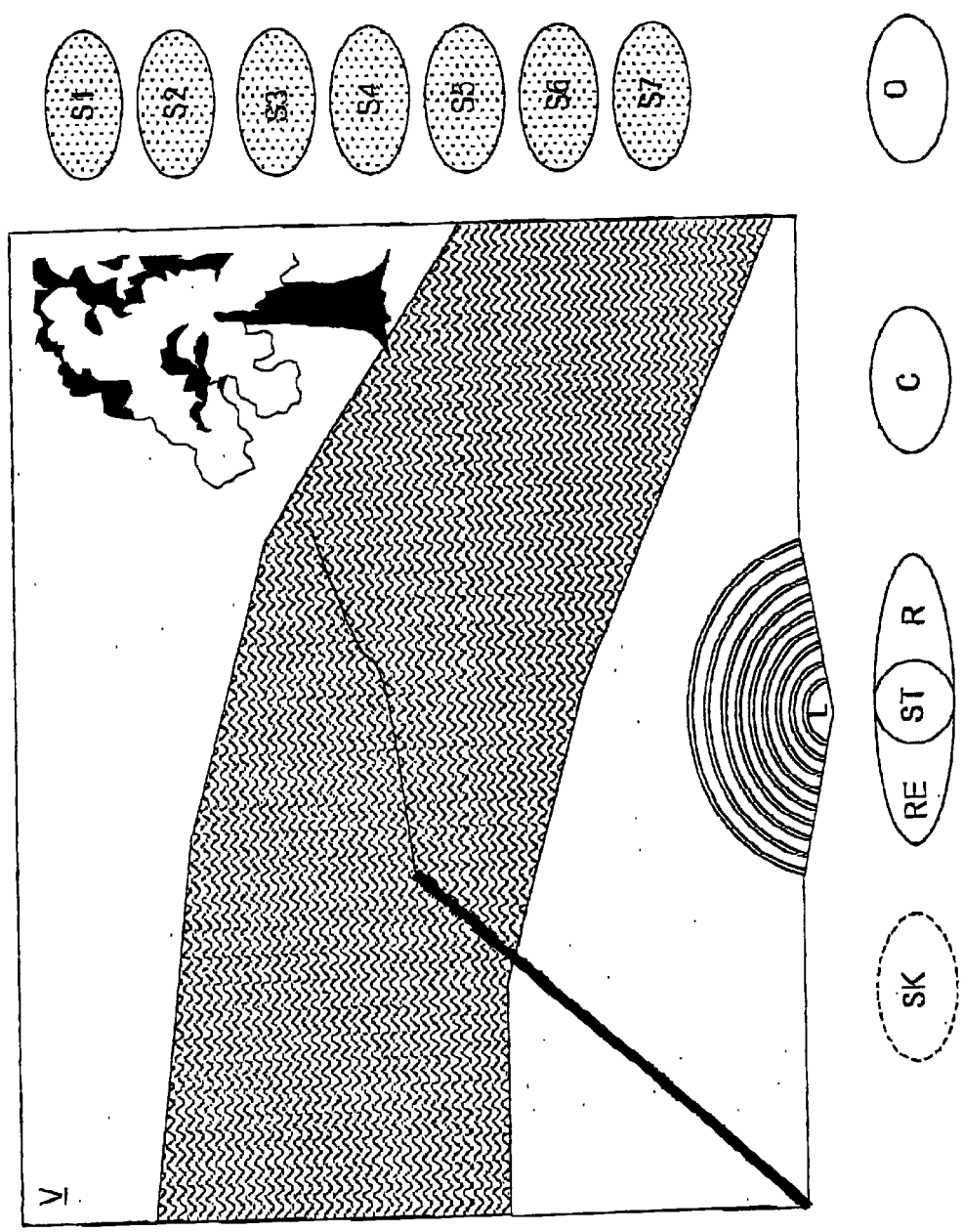
FIG. 12 is a schematic diagram of a display during the interactive video display stage.

The user clicks on the 'cast' button C (step S110) to begin the interactive video sequence. The program then selects (S120) a casting video clip according to the location and optionally other selected parameters. The casting video clip is displayed, as shown schematically in FIG. 12.

Catch Possibility

The program determines (S130) whether it is possible to catch a fish with the selected combination of parameters using stored rules. For each location, a subset of possible parameter combinations is stored and a catch is only possible if one of that subset is selected. For example:

Rule for location 1

If rod length is not 11 ft 3 in then catch is impossible.

The program may also apply general rules which are independent of the location. For example:

Rule for all locations

If fly type is dry and line is not floating then catch is impossible.

The program may also apply rules which are specific to types of fish available and not already caught at the selected location. For example, a catch may be impossible for brown trout with certain types of fly.

Hence, the program selects those rules which are applicable for the selected parameters and the available fish, and applies those rules to the selected parameters to determine whether a catch is possible or impossible. Where more than one type of fish is available, this determination may be made for each fish type.

If it is not possible to catch a fish, the outcome is no bite (S150).

Bite

If it is possible to catch a fish, the program then makes a random or pseudo-random determination (S150) of whether a bite is achieved on the current cost. If no bite is achieved, then the outcome is no bite. If a bite is achieved, then a bite video clip is selected for display, dependent on the type of fish and the location, and is displayed (S160) immediately following the casting video clip.

The program then determines (S170) whether the user has clicked the strike button ST within a predetermined period after an interval from the start of the bite video clip, for example between 2 and 3 seconds after the start. Optionally, the strike button may be illuminated during this period. If the user does not do so, then the outcome is deemed unsuccessful for failure to strike (S180).

Play

After the strike, the user must then 'play' the fish correctly in order to land it. If the user does click the strike button ST within the predetermined period, then the program selects a 'play' video clip according to the location and fish type, and begins to display the play video clip (S190). program selects a 'play' video clip according to the location and fish type, and begins to display the play video clip (S190).

Associated with each play video clip is a stored set of time periods during which the fish is being run or retrieved, for example:

Retrieve1=7,4
Run2=15,1
Retrieve3=18,1
Run4=23,1
Retrieve5=30,2 where the first number indicates the start time and the second indicates the interval, both in seconds.

Figure 13A:
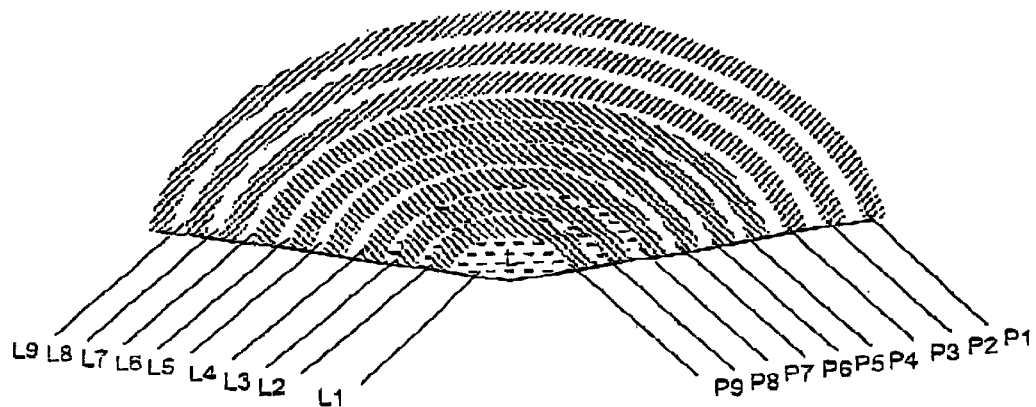
FIGS. 13a to 13c show different states of indicia showing the progress and status of the interactive video display stage.
Figure 13B:
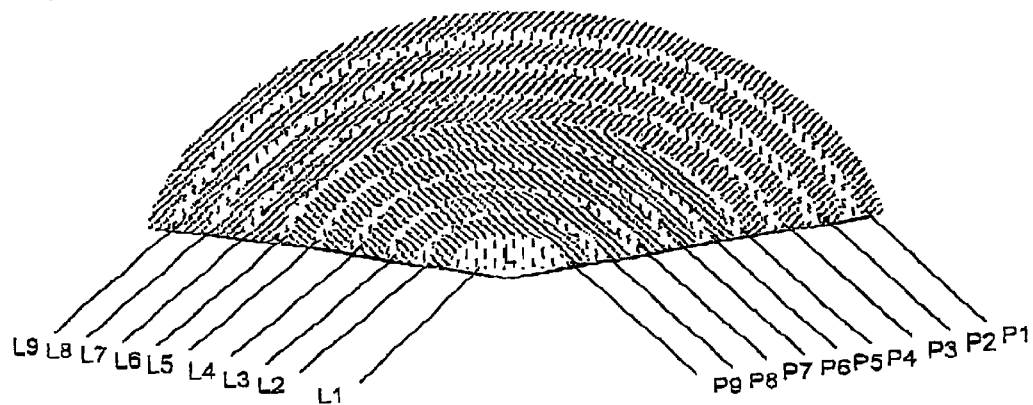
Figure 13C:
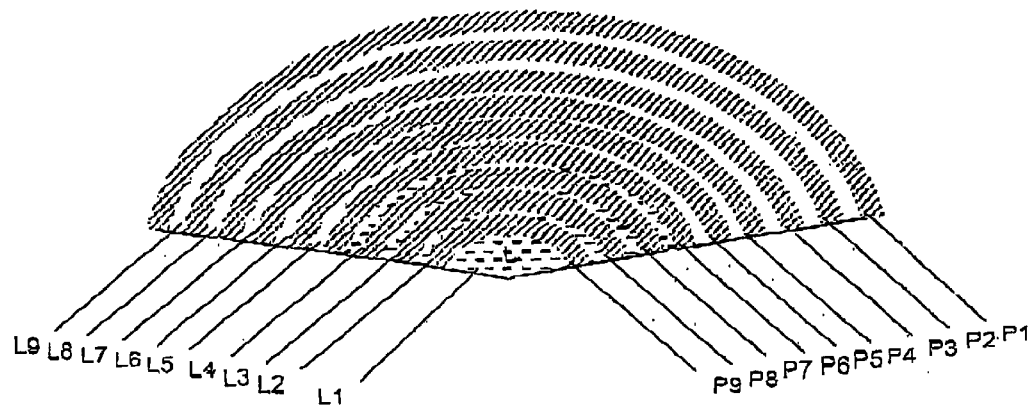

The progress of the play video clip and the run period or retrieve period is indicated by a line control indicator L, consisting of concentric alternating run/retrieve rings L1 to L9 and progress rings P1 to P9, as shown in detail in FIGS. 13a to 13c.

The progress rings light up or change colour progressively from the outer ring P1 to the inner ring P9 to indicate the progress of the play video clip. For example, where the play video clip is 32 seconds long, one more progress ring will light up every 32/9 seconds.

During a run period, the program detects the frequency with which the user clicks the run button R. If the frequency is less than a predetermined value, which may be stored as a parameter of the run period for that clip, then the run/retrieve rings light up red progressively from the inner ring L1 to the outer ring L9, as shown in FIG. 13a. This progression may be reversed if the user is clicking with the correct frequency or higher. If the outer ring L9 is red for more than a predetermined length of time, then the outcome is deemed unsuccessful by the line breaking.

Likewise, during a retrieve period, the program detects the frequency with which the user clicks the retrieve button RE. If the frequency is less than a predetermined value, which may be stored as a parameter of the retrieve period for that clip, then the run/retrieve rings light up green progressively from the inner ring L1 to the outer ring L9. This progression may be reversed if the user is clicking with the correct frequency or higher. If the outer ring L9 is green, as indicated in FIG. 13b, for more than a predetermined length of time, then the outcome is deemed unsuccessful by the fish escaping.

If the end of the play video clip is reached (S200) without the outcome being deemed unsuccessful (S210), then the outcome is deemed successful (S220).

Outcome Stage

Once an outcome has been determined, an outcome video clip is selected, or no video clip is selected, dependent on the type of outcome, for example no bite, no strike, line broken, fish lost or fish caught. For example, if the fish is caught (S220), a video clip is selected and displayed showing a fish being netted and landed at the appropriate beat, and a message displaying the type of fish is displayed. If the fish is lost (S210), a message 'fish lost' may be displayed without any video clip. The diary record for the current fisherman is updated to record the outcome.

Repeat

After a fish is caught or lost, the program returns to the parameter selection stage with the currently selected parameters, and allows the user to change any of the parameters in preparation for another cast. The user may move onto the next location at the selected destination by clicking the 'Stalk' button SK; a video clip is displayed of the stalk to the next location.

The fly box F indicates the condition of the currently selected fly, for example by progressively illuminating a number of buttons or by displaying an image representing the condition. After six casts without a bite, or on each occasion after a fish is lost or caught, the user must 'dress' the fly by clicking on the fly box F. This returns the fly to its original condition.

If all of the fish available at the current location have been caught, the program displays a congratulatory message and a list of the relevant fish. The details may be displayed and the video sequence replayed by clicking on the desired item from the list.

Although one embodiment has been described in terms of fly-fishing, it will be understood that other sports or activities may be simulated in a similar way. Preferably, the activities should be such that can be represented from a first person perspective that does not vary while an action is performed. For example, the present invention can also be applied to a golf simulation, or a baseball simulation. The invention is less suitable for a football simulation, in which the position and orientation of the player must change constantly and it is not feasible to store a video clip for each possible movement; however, it may be applied to a goalkeeper perspective in a penalty shoot-out.

In one preferred embodiment, the video clips are stored on a DVD, but alternatively a high-bandwidth Internet or cable connection may be used to retrieve the required video clip.

What is claimed is:

1. A method of performing a video simulation on a computer having user input means (10, 12), processing means (2), display means (7) and selective video clip retrieval means (16, 18). comprising:
   a. displaying on said display means a plurality of parameter options (S1–S7);
   b. receiving via said user input means a selection of one of said parameter options (S1–S8);
   c. displaying in response to the selection of one of said parameter options a set of parameter values (I1–I6; F1–F9);
   d. receiving via said user input means (10; 12) a selection of one of said set of parameter values (I1–I6; F1–F9);
   e. selecting, on the basis of at least said selected parameter value and on a random or pseudo-random determination, a video clip (V) via said video retrieval means (16; 18); and
   f. displaying said video clip (V) on said display means (7).

2. A method according to claim 1, wherein steps a to d are performed for more than one of said plurality of parameter options (S1–S8).

3. A method according to claim 1, wherein steps a to d are performed for each of said plurality of parameter options (S1–S8).

4. A method according to claim 1, wherein said video clip (V) is selected on the basis of one or more predetermined rules dependent on said selected parameter values (I1–I6; F1–F9).

5. A method according to claim 1, wherein the set of parameter values for one of said parameter options is selected from a superset of possible parameter values, dependent on the selection of a parameter value of another one of said parameter options.

6. A method according to claim 1, including displaying a preceding video clip (V) on said display means (7) before step f, wherein said video clip (V) is further selected on the basis of user input actuations during said preceding video clip (V).

7. A method according to claim 6, including displaying variable indicia (L1–L9) on said display means in combination with said preceding video clip (V).

8. A method according to claim 1, including displaying variable indicia (P1–P9) indicating the progress of the video clip (V).

9. A computer program arranged to perform the method according to claim 1.

10. A carrier bearing a computer program according to claim 9.

11. A carrier according to claim 10, additionally bearing a plurality of video clips (V) from which said video clip (V) and/or said preceding video clip (V) may be selected.

12. A method of performing a video simulation on a computer having user input means (10, 12), processing means (2), display means (7) and selective video clip retrieval means (16, 18), comprising:
   a. retrieving and displaying a first video clip (V);
   b. displaying indicia (L1–L9) during the display of the first video clip (V); and
   c. in response to a user actuation via the user input means (10, 12). varying the display of the indicia (L1–L9) while continuing to display the first video clip (V);
   d. wherein a second video clip (V) is selected from a plurality of possible second video clips for display after the first video clip (V), in dependence on said user actuation.

13. A method according to claim 12, further including displaying variable indicia (P1–P9) indicating the progress of the first video clip.

14. A method of performing a video fishing simulation on a computer having user input means (10, 12), processing means (2), display means (7) and selective video clip retrieval means (16, 18), comprising:
   a. receiving (S80), from a user, a selection of one or more possible parameters relating to fishing equipment;
   b. displaying (S110) a first vide clip (V) representing the start of a current fishing activity;
   c. determining (S130, S150) whether it is possible to catch a fish during the current fishing activity according to the selection of parameters, and if so,
   d. displaying (S160) an indication that a bite has been achieved;
   e. determining (S170) whether a user interaction has taken place within a predetermined time after the bite has been achieved; and if so,
   f. displaying (S190) a second video clip (V) representing a fish being caught;
   g. displaying, during said second video clip, indicia which are variable in response to a user input; and
   h. determining (S200) an outcome of the simulation based on said user input.

* * * * *

UNITED STATES PATENT AND TRADEMARK OFFICE
CERTIFICATE OF CORRECTION

PATENT NO. : 6,750,865 B2
DATED : June 15, 2004
INVENTOR(S) : Peter Townsend

It is certified that error appears in the above-identified patent and that said Letters Patent is hereby corrected as shown below:

Column 1,
Line 35, delete "stimulate" and substitute therefor -- simulate --
Line 48, delete "gage" and substitute therefor -- game --
Line 64, delete "id" and substitute therefor -- is --

Column 3,
Line 23, delete "successfull" and substitute therefor -- successful --
Line 28, delete "3a and 3b" and substitute therefor -- 3 and 4 --
Line 40, delete "Ply" and substitute therefor -- Fly --

Column 4,
Line 34, delete "test" and substitute therefor -- text --

Column 5,
Line 12, delete "many" and substitute therefor -- may --
Line 13, delete "Alteratively" and substitute therefor -- Alternatively --

Column 8,
Line 32, delete "." and substitute therefor -- , --
Line 48, delete "vide" and substitute therefor -- video --

Signed and Sealed this

Nineteenth Day of April, 2005

JON W. DUDAS
*Director of the United States Patent and Trademark Office*